United States Patent [19]

Dingsøyr et al.

[11] Patent Number: 5,769,939
[45] Date of Patent: Jun. 23, 1998

[54] CEMENT BASED INJECTION GROUT

[75] Inventors: Eldar O. Dingsøyr; Per Fidjestøl, both of Søgne; Oddny Jørgensen, Høvåg, all of Norway

[73] Assignee: Elkem ASA, Norway

[21] Appl. No.: 869,094

[22] Filed: Jun. 4, 1997

Related U.S. Application Data

[63] Continuation of Ser. No. 646,282, filed as PCT/NO94/00197, Dec. 7, 1994 published as WO95/15931, Jun. 15, 1995, abandoned.

[30] Foreign Application Priority Data

Dec. 7, 1993 [NO] Norway ................................. 934443

[51] Int. Cl.$^6$ ............................. C04B 14/04; C04B 18/14
[52] U.S. Cl. ...................... 106/737; 106/719; 106/721; 106/803; 106/812; 106/819; 405/266
[58] Field of Search ................................. 106/721, 737, 106/803, 819, 823, 726, 719, 812; 405/266

[56] References Cited

U.S. PATENT DOCUMENTS

| | | | |
|---|---|---|---|
| 4,310,486 | 1/1982 | Cornwell et al. | 106/737 |
| 4,588,443 | 5/1986 | Bache | 106/737 |
| 4,935,060 | 6/1990 | Dingsoyr | 106/803 |
| 5,151,126 | 9/1992 | Ranc et al. | 106/719 |
| 5,340,397 | 8/1994 | Brothers | 106/819 |
| 5,346,012 | 9/1994 | Heathman et al. | 106/737 |
| 5,472,501 | 12/1995 | Dastol | 106/737 |

FOREIGN PATENT DOCUMENTS

| | | |
|---|---|---|
| 0412913 | 2/1991 | European Pat. Off. |
| 0497691 | 8/1992 | European Pat. Off. |
| 0572261 | 12/1993 | European Pat. Off. |
| 164988 | 10/1985 | Norway |
| 168765 | 12/1989 | Norway |
| 452455 | 11/1986 | Sweden |
| 8805425 | 8/1988 | WIPO |

OTHER PUBLICATIONS

Doctoral Thesis, Stockholm, Sweden 1993, Royal Institute of Technology, "Rheology of Fresh Cement–Based Grouts", Ulf Hakansson; pp. i–4; 56; 66–69; 139–141; and II:7 (no month).

Fjellsprengningsteknikk 1981, Bergmekanikk 1981, Geoteknikk 1981 Norsk Jord—OG Fjellteknisk Forbund Tilknyttet Nif Papri—1982,pp. 23.1 through 23.8 (no month).

Fjellsprengningskonferansen, Nov. 23, 1989 , Bergmekanikkdagen, Nov. 24, 1989, Geoteknikkdagen, Nov. 24, 1989, pp. 16.1 through 16.7.

Primary Examiner—Michael Marcheschi
Attorney, Agent, or Firm—Bierman, Muserlain and Lucas

[57] ABSTRACT

The present invention relates to a cement-based injection grout containing microcement and water for consolidation and/or waterproofing fine granular soils, finally fissured soils and cracks in rocks or concrete structures. In addition to microcement and water the grout contains amorphous silica particles in an amount of 5–70% based on the weight of cement and 0–10% water-reducing agents based on the weight of the cement, said grout having a weight ratio between water and cement+amorphous silica between 2 and 8.

8 Claims, No Drawings

CEMENT BASED INJECTION GROUT

This application is a continuation of application Ser. No. 08/646,282 filed May 13, 1996, now abandoned, which was a 371 of International Application No. PCT/NO94/00197 filed Dec. 7, 1994, published as WO95/15931, Jun. 15, 1995.

TECHNICAL FIELD

The present invention relates to a cement-based injection grout for consolidation and/or water proofing fine granular soils, finally fissured soils and cracks in rocks or concrete structures.

BACKGROUND ART

The known cement-based grouts used for consolidating the above structures consist of so-called microcement, water and surface active agents. Microcement is a Portland cement which is milled and/or classified to obtain a cement where a substantial part of the cement particles have a size of less than 10 microns and where all the particles have a size below 50 microns. For cement-based injection grouts it is, in order to obtain a good penetration, important that the grout has a low viscosity. Thus, it is an advantage that such cement-based grouts have a water to cement ratio as high as possible. For cement-based grouts consisting of microcement, water and optionally surface-active agents, the highest possible water to cement ratio is about 3. At a higher water content water separation will occur.

U.S. Pat. No. 5,151,126 relates to a cement-based injection grout of the above-mentioned kind, consisting of fine Portland cement where as much as possible of particles above 30 microns have been removed and where a water-reducing agent is added to the cement and where the weight ratio between water and cement does not exceed 0.6. It is further stated that the injection grout may contain a fine binding product such as pozzolanes, finely ground slags, silica gel or thermal silica in a proportion of 0.5 to 10% by weight of the total of the dry product. It is, however, not disclosed or indicated in U.S. Pat. No. 5,151,126 that addition of a fine binding agent makes it possible to use a higher weight ratio between water and cement. At the low water to cement ratio mentioned in U.S. Pat. No. 5,151,126 the penetration depth in soils having fine cracks, will be very limited.

In addition to grouts consisting of microcement and water, it is known to use injection grout consisting of slaked lime, microsilica and water for consolidation of fine granular soils. Such grouts are disclosed in Norwegian patents No. 168765 and 164988 and in Swedish patent publication No. 452455. The grouts based on slaked lime and microsilica do, however, suffer from the disadvantage that they have long thickening and setting time and curing accelerators therefore have to be added in order to obtain an acceptable setting time. Addition of curing accelerators as disclosed in Norwegian patent No. 168765, do, however, provide for a more complicated and costly injection grout, and in addition, the high amount of curing accelerator may reduce the penetration depth of the grouts.

DISCLOSURE OF INVENTION

It is an object of the present invention to provide a microcement-based injection grout having a high water to cement ratio, low water separation and high penetration.

Accordingly, the present invention relates to an injection grout comprising microcement and water, characterized in that it further contains amorphous silica particles in an amount of 5–70% based on the weight of cement and 0–10% water-reducing agents based on the weight of the cement, said grout having a weight ratio between water and cement+amorphous silica between 2 and 8.

According to a preferred embodiment the grout contains 10–60% by weight and preferably by 15–40% by weight of amorphous silica particles based on the weight of cement.

As amorphous silica particles amorphous silica fume recovered from off-gases from electrical smelting furnaces producing at least 75% ferrosilicon is preferably used, but fume from furnaces producing 50% ferrosilicon and fume from electrical furnaces for production of CaSi can also be used as amorphous silica particles in the grout according to the present invention. Such types of silica fume are hereinafter called microsilica.

It is also possible to obtain silica fume as a main product from the above-mentioned furnaces by adjusting the operating parameters for the furnaces. Amorphous silica can also be produced synthetically without reduction and oxidation. Alternatively a silica fume generator can be used to produce fine silica. Amorphous silica can also be used in the form of colloidal silica, silica gel and precipitated silica. The amorphous silica can also be naturally occuring silica such as diatomaceous earth.

The fine amorphous silica particles may contain 60–100% by weight of $SiO_2$, and have a density between 2.00 and 2.40 g/cm$^3$ and a specific surface area of about 10 m$^2$/g. The particles have preferably such a particle size that at least 90% of the particles are less than 10 microns. Variations in these parameters are possible. The amorphous silica particles may for example have a lower $SiO_2$ content and the particle size distribution can be adjusted for example by removing coarse particles or by milling the silica particles. For best results it is preferred that 98% of the amorphous silica particles have a particle size below 10 microns.

The weight ratio between water and cement+amorphous silica in the injection grout is preferably between 3 and 6.

The injection grout according to the present invention preferably contains a water-reducing agent in an amount between 1 and 10% by weight based on the weight of cement. Conventional water-reducing agents for use in connection with cement and concrete may be used, such as for example sulphonated melamine derivatives, sulphonated naphtalene derivatives, sulphonated lignine derivatives, carbohydrate derivatives and polyacrylates.

The cement-based injection grout according to the present invention may further contain curing accelerators and optionally thickening additives like bentonite.

It has surprisingly been found that even at such a high ratio between water and cement+amorphous silica as 5 the water separation for the injection grout according the present invention is very small, which gives a good penetration on injection. The cured grout has shown to give a good waterproofing and an acceptable strength.

DETAILED DESCRIPTION OF PREFERRED EMBODIEMENTS

EXAMPLE 1

Injection grouts consisting of microcement and varying amounts of microsilica and having a varying water to cement+microsilica ratio were produced. For comparison purposes it was also produced injection grouts of microcement without addition of amorphous silica particles.

An ultrafine cement produced by Cementa AB, Sweden was used in the tests. The cement had such a particle size that 95% of the particles were less than 16 microns. As amorphous silica it was used microsilica produced by Elkem a/s, Norway. The microsilica had such a particle size that at least 90% of the particles were less than 10 microns. The microsilica was added as an aqueous slurry containing 50% by weight of microsilica.

The composition of the injection grouts are shown in Table I. In Table I injection grouts Nos. 2, 3, 5, 6, 8, 9, 11 and 12 are according to the present invention while the injection grouts No. 1, 4, 7 and 10 are grouts which do not contain amorphous silica particles and are shown for comparison purposes.

The injection grouts Nos. 1–12 in Table I were tested as to setting time, water separation and penetration depth.

Setting time was measured by placing 200 ml injection grout in a plastic container closed with a lid. The container was turned up-side down at certain time intervals. The setting time was than measured as the time from mixing the grout until no flow was observed when turning the container.

Water separation was measured by filling grout into a 250 ml graduated cylinder. Free water in ml after two hours storage of the graduated cylinder was taken as a measure for water separation.

Penetration depth was measured by injecting the grout into a tube made from plexiglass having a length of 85 cm and a diameter of 5 cm, said tube being filled with SILVERSAND 17 delivered by Ahlseth, Sweden. SILVERSAND 17 has such a particle size that all particles are less than 0.5 microns and 95% are greater than 0.1 microns. The tube was placed horizontally and the injection grout was pumped into the tube at a rate of 16 liters per hour until it was impossible to pump any slurry at a pressure of 60 KPa. The penetration depth was then measured.

weight of PERAMIN F based on the weight of cement. Peramin F is a water-reducing agent based on a sulphonated melamine formaldehyde derivative delivered by Perstorp AB, Sweden.

The penetration depth was measured as in Example 1. The results showed a penetration depth of 21, 33 and 49 cm for the three grouts. A substantial increase of the penetration depth was thus obtained by addition of water-reducing agents.

We claim:

1. An injection grout comprising:
    (a) microcement;
    (b) water;
    (c) about 5 to 70% by weight of amorphous silica particles based on the weight of cement, said amorphous silica particles having about 60–100% by weight $SiO_2$, a density between about 2.0 and 2.4 g/cm$^3$, a surface area of about 10 m$^2$/g, and at least about 90% having a particle size of less than about 10 microns;
    (d) about 0 to 10% by weight of water reducing agents based on the weight of the cement;
    (e) said grout having a water to cement and amorphous silica weight ratio of between about 2 and 8;
    (f) said grout having a lower water separation than a comparable grout made with microcement and water without said amorphous silica particles; and
    (g) said grout having a higher penetration into a space into which said grout is injected than a comparable grout made with microcement and water without said amorphous silica particles.

2. The injection grout of claim 1 wherein said amorphous silica particles are present in said grout in an amount of about 10 to 60% by weight of the cement.

3. The injection grout of claim 1 wherein said weight ratio of water to cement and amorphous silica is about 3 to about 6.

TABLE I

| Grout No: | 1 | 2 | 3 | 4 | 5 | 6 | 7 | 8 | 9 | 10 | 11 | 12 |
|---|---|---|---|---|---|---|---|---|---|---|---|---|
| Microcement, gram | 100 | 100 | 100 | 100 | 100 | 100 | 100 | 100 | 100 | 100 | 100 | 100 |
| Microsilica, gram | 0 | 11 | 33 | 0 | 33 | 54 | 0 | 33 | 54 | 0 | 33 | 54 |
| Weight ratio water/cement + microsilica | 3 | 3 | 3 | 4 | 4 | 4 | 5 | 5 | 5 | 6 | 6 | 6 |
| Setting time, hours | 4,5 | <6 | 5 | 7,5 | 10 | 10 | 7,5 | 9 | 9 | ** | 8 | 8 |
| Water separation, ml | 108 | 30 | 4 | 133 | 7 | 2 | 169 | 19 | 6 | ** | 50 | 10 |
| Penetration depth, cm | 2 | 9 | 10 | 7 | 23 | 34 | * | 28 | 14 | ** | 43 | 45 |

*Due to very large water separation, no penetration depth could be measured.
**Mixing resulted in an almost total water separation. Setting time and penetration depth could therefore not be measured.

The results in Table I show that the injection grout according to the present invention has a very low water separation even at a water to cement+microsilica ratio of 6, while the grouts according to the prior art grout Nos. 1, 4, 7, 10 have unacceptably high water separation even at a water to cement ratio as low as 3 and can for this reason not be used for injection.

Table I further shows that the setting time for the grouts according to the present invention are not substantially longer than for the grouts according to the prior art, even at very high ratios between water and cement+microsilica.

EXAMPLE 2

In order to study the effect of a water reducing agent, a grout was produced having the same composition as Grout No. 3 in Table I. To this Grout it was added 1, 3 and 5% by 4. The injection grout of claim 1 wherein said water reducing agent is present in an amount of about 1 to about 10% by weight of the cement.

5. The injection grout of claim 2 wherein said weight ratio of water to cement and amorphous silica is about 3 to about 6.

6. The injection grout of claim 2 wherein said water reducing agent is present in an amount of about 1 to about 10% by weight of the cement.

7. The injection grout of claim 3 wherein said water reducing agent is present in an amount of about 1 to about 10% by weight of the cement.

8. The injection grout of claim 5 wherein said water reducing agent is present in an amount of about 1 to about 10% by weight of the cement.

* * * * *